Feb. 17, 1942.　　　G. F. FISHER　　　2,273,008
AUTOMATIC ANIMAL TRAP
Filed Nov. 3, 1939　　　3 Sheets-Sheet 1

Inventor
George F. Fisher

Eugene C. Brown
Attorney

Feb. 17, 1942.　　　　G. F. FISHER　　　　2,273,008
AUTOMATIC ANIMAL TRAP
Filed Nov. 3, 1939　　　　3 Sheets-Sheet 2
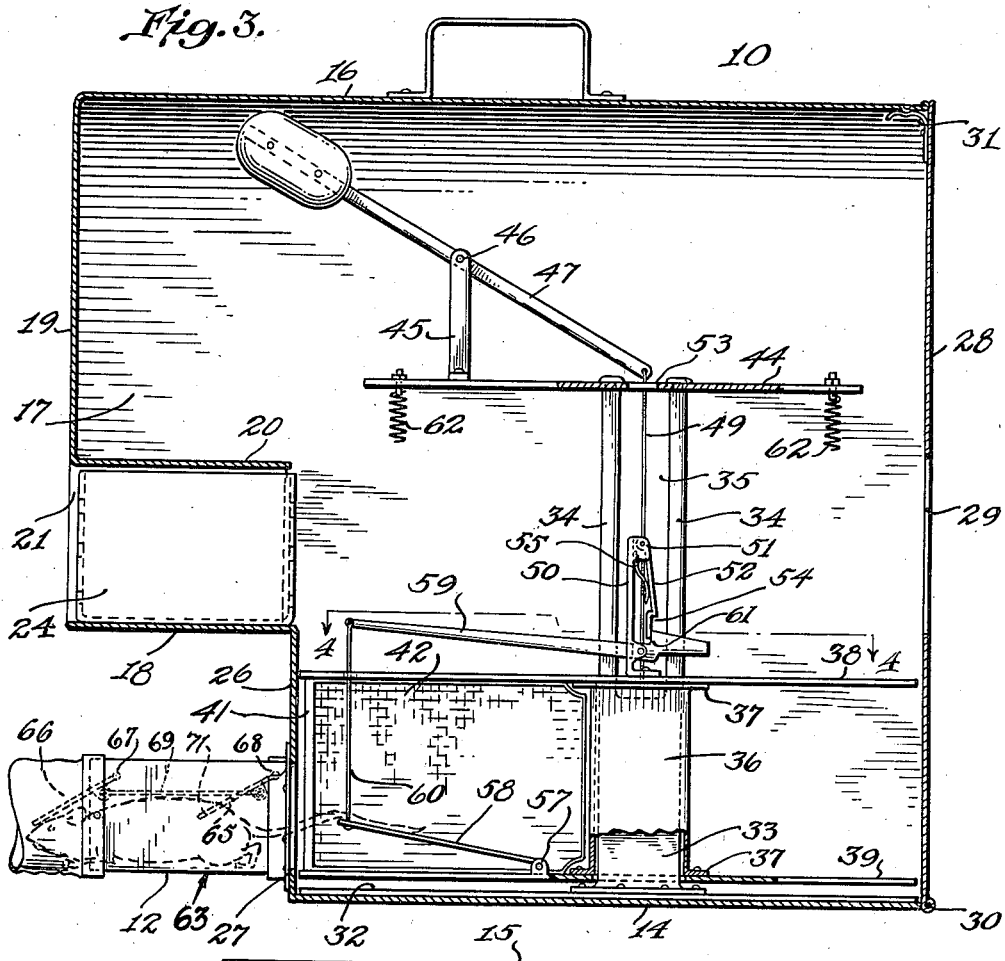
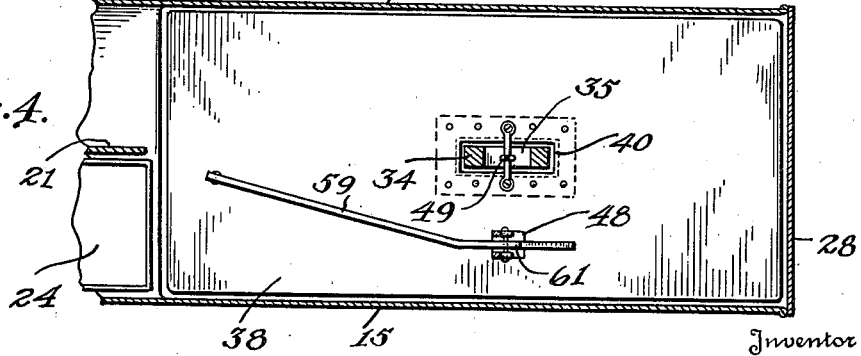
Inventor
George F. Fisher
Eugene C. Brown
Attorney Feb. 17, 1942.  G. F. FISHER  2,273,008
AUTOMATIC ANIMAL TRAP
Filed Nov. 3, 1939  3 Sheets-Sheet 3
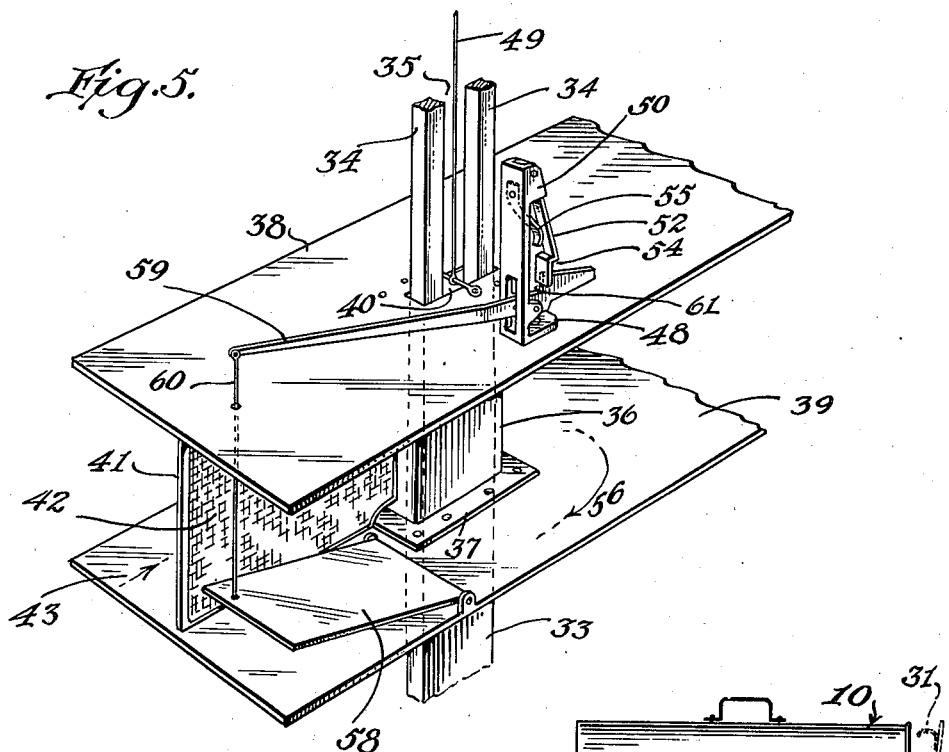
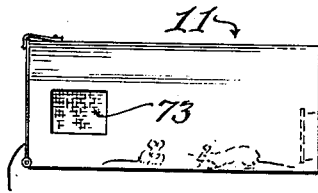
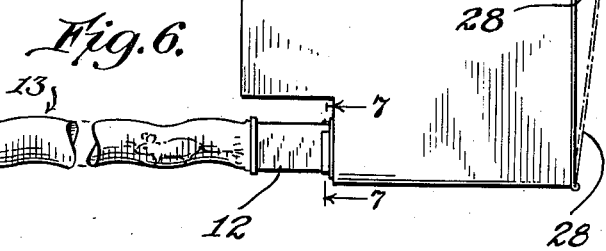
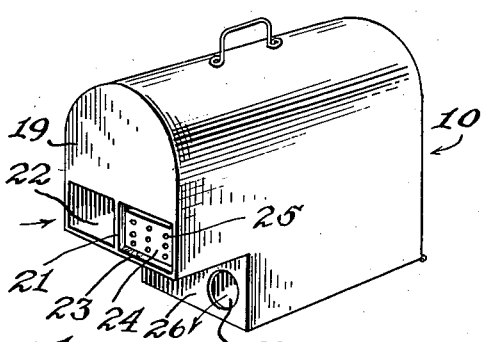
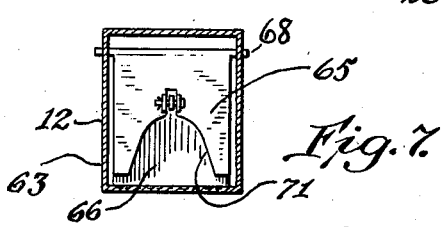
Inventor
George F. Fisher
Eugene E. Brown
Attorney Patented Feb. 17, 1942

2,273,008

UNITED STATES PATENT OFFICE 2,273,008

AUTOMATIC ANIMAL TRAP

George F. Fisher, Oklahoma City, Okla.

Application November 3, 1939, Serial No. 302,781

1 Claim. (Cl. 43—68)

This invention relates to animal traps and has special reference to an improvement in the type of animal traps shown and described in my former patents numbered respectively 1,546,976, of July 21, 1925, and 1,740,583, of December 24, 1929.

Among the objects of this invention is to provide a novel arrangement wherein improved means are used for guiding the elevator cage in traps of the type shown in said prior patents; to provide an improved latching means for the elevator cage; to provide an arrangement wherein the entering animal will have before him what appears to be a clear passage through the trap; to provide a live chamber or compartment accessory to the main trap wherein the animal will be held; and to provide means whereby the live chamber or trap may be connected to the main trap in such manner that an animal will readily pass from the main trap to the live trap and there be detained.

The invention will now be described in detail, particularly pointed out in the claim and illustrated in the drawings, wherein—

Figure 3 is a view similar to Figure 1 but showing the elevator portion of the trap depressed and an animal passing therefrom to the passage or corridor leading to the live chamber or box.

Figure 4 is a fragmentary section on the line 4—4 of Figure 3.

Figure 5 is a perspective view illustrating the elevator part of the trap and the parts directly associated therewith for guiding and holding such elevator.

Figure 6 is a side elevation showing the entire assembly of the main and live portions of the trap.

Figure 7 is a section on the line 7—7 of Figure 6.

Figure 8 is a perspective view of the main portion of the trap.

Figure 1:
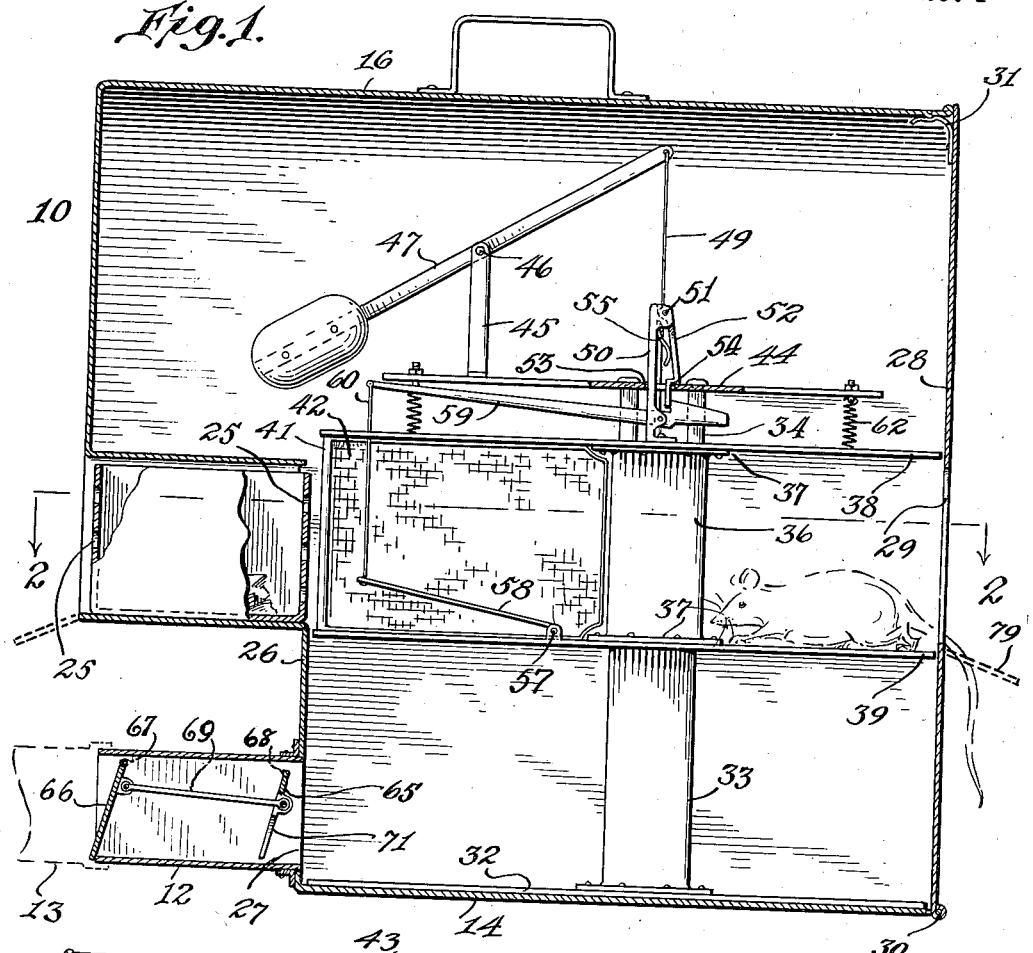
Figure 1 is a vertical sectional view taken longitudinally through the main part of the trap.

As best shown in Figure 6 the invention consists in general of a main trap portion 10, an auxiliary live trap portion or retaining cage 11, a gateway 12, and a flexible tube 13 forming a corridor or passage from the gate portion 12 to the live or retaining chamber 11.

The main housing or body of the trap 10 is provided with a floor 14 from which rises vertical sides 15 connected at the upper ends by a semi-cylindrical top 16. At one end the upper part of the sides and the top 16 are extended to provide an overhanging portion 17 having a bottom shelf or floor 18. An end wall 19 closes the upper part of the overhanging portion 17 but has its lower edge spaced above the floor 18. From the lower edge of the end wall 19 the portion 20 extends inwardly parallel to the floor 18 and a partition 21 divides the space formed between the floor 18 and wall 20 into a pair of openings indicated respectively as 22 and 23. A bait receptacle 24 having perforations 25 in each end so that the odor of the cheese or other bait may be scented by the animal both from without and from within the trap is removably located in the opening 23. From the bottom of the inner end of the floor or shelf portion 18, there extends downwardly an end wall 26 having an opening 27 adjacent its lower part. The opposite end of the trap body is closed in part by a vertical wall which is provided with an opening 29 extending substantially from one side wall 15 to the other with the lower edge of this opening about level with the floor portion 18. The end wall 28 of the trap housing is hinged at the bottom as at 30 and is provided at its upper end with latch means 31, whereby the end of the housing may be held closed.

Figure 2:
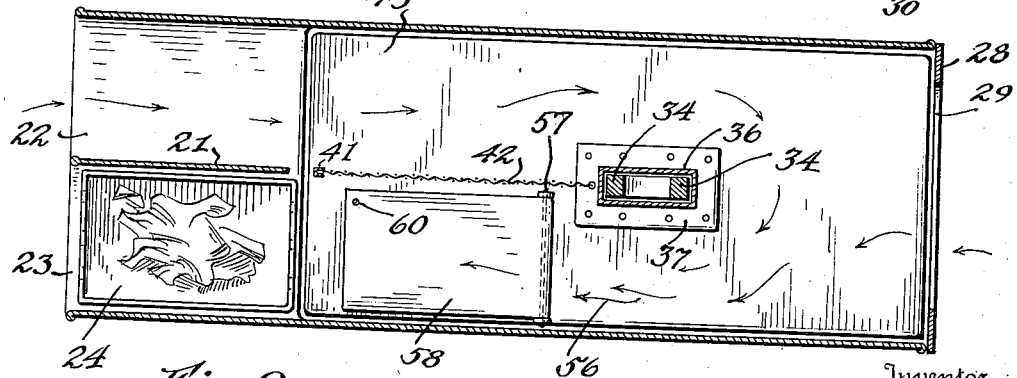
Figure 2 is a horizontal section on the line 2—2 of Figure 1.

The elevator and operating parts are removable as a unit from the main housing when the end wall 28 is swung downwardly. This unit is provided with a base plate 32 which rests on the floor 14 between the ends 26 and 28. Projecting upwardly from this base plate 32 is a guide bar or post 33 of rectangular cross-section having its upper end bifurcated to provide a pair of arms 34 with a space 35 therebetween. Slidably mounted on the post or guide 33 is a rectangular tubular member or sleeve 36 having flanges 37 at its top and bottom to which are fastened an upper elevator plate 38 and a lower elevator plate 39. The plates 38 and 39 are provided with holes or openings 40 for the passage of guide post 36. Between the plates 38 and 39, and extending from adjacent the tube 36 to the ends of the plates nearest the wall 26 is a frame 41 supporting a reticulated partition 42. The partition 42 is aligned with the partition 21 so that the passage 22 aligns with a passage 43 on one side of the partition 42. Under these circumstances as shown in Fig. 2, the opening of the passage 22 and the opening 29 at the rear wall 28 are in alinement so that an animal entering either opening may see what appears to be a clear passage extending entirely through the trap.

Supported on top of the post 34 is a platform 44 whereon is mounted a bracket 45 having a pivot 46 at its upper end. A counter-balanced lever 47 is mounted intermediate its ends on the pivot 46, one end of the lever extending over an opening 48 formed in the platform 44 and connected by a cable 49 to the plate 38. The other end of the lever 47 is counter-balanced by a weight which is sufficiently heavy to lift the elevator. However, the counter weight is not heavy enough to retain the elevator in its upper position when an animal enters this elevator when the latter is unlatched. In order to hold the elevator elevated in normal set position when an animal enters the same the following latch mechanism is provided. A bracket 50 carrying a pivot 51 at its upper end is mounted on the upper elevator plate 38. From the pivot 51 depends an arm 52 having an inset lower end to provide a downwardly facing shoulder 54 adjacent the lower end of said arm 52. The arm 52 is yieldingly pressed away from the bracket 50 by means of a leaf spring 55. As shown in Figure 1 whenever the elevator is in its uppermost position the bracket 50 and arm 52 pass upward through an opening 53 in the plate 38, so that the shoulder 54 engages on the platform 44 adjacent said opening 53. Thus the elevator is held in raised position by the latch arrangement just described and cannot drop until the arm 52 is moved inwardly against the spring action of the spring 55 to free the shoulder of 54 from engagement with the upper side of the platform 44.

On the side of the partition 42 opposite the passage 43, is a passage 56 which is in alinement with the bait box 24. On the lower elevator plate 39 at the entrance of the passage 56 there is provided a treadle 58 hinged to ears 57, which is normally inclined upwardly and forwardly toward the cheese or bait box. A latch actuating lever 59 is connected to the forward end of the treadle 59 by a link 60. The short arm of the lever 59 is provided with a shoulder 61 which engages against the outer face of the lower end of the arm 52. Thus when the lever is tilted by the downward movement of the treadle 58, the shoulder 61 forces the lower end of the arm 52 inwardly so that the shoulder 54 on said arm is moved off of the upper side of the platform 44 and the elevator is thus released for downward movement.

Secured to the under side of the stationary platform 44, are the check springs 62 which serve, when the elevator rises, to bring it smoothly into its elevated position without shock and maintain the elevator firmly on a level plane.

When the live storage box is located in a compartment of the main trap, any noise made by the trapped animals will frighten other animals away from the trap. I have therefore provided an arrangement whereby the trapped animals are successively conducted into an auxiliary chamber or compartment 11, accessory to the main trap but located at a convenient distance away.

An exit opening 27 is provided adjacent the bottom of wall portion 26 below the bait box extension, to which a gate chamber or vestibule 12 is connected. The gate chamber 12 consists of a metal body or casing 63 provided with a pair of imperforate gate members or flap valves 65 and 66 located at either end of said chamber or vestibule and, pivoted at 67, 68, to the body or casing 63. The valves are connected by a link 69 to move in unison.

The front flap valve 65 is provided with a recessed lower edge to form an arcuate space 71 between the lower edge of the valve and the inner wall of the tube 63. The rear valve 66 fits closely within the wall of the casing, when it is in normal closed position.

The conduit 13 which leads from the gate chamber or vestibule 12 to the auxiliary storage live chamber 11, may be constructed of wire mesh or of other suitable material having a wire reinforcement. The auxiliary metal chamber 11 is provided with a hinged door 72 and may be provided with a reticulated window 73.

If desired an inclined runway or platform 79 may be arranged to lead upwardly to the opening 29 and a similar inclined platform may be arranged to lead upwardly to the passage 22.

In the operation of the device the animal may enter the main body of the trap through either the opening 29 or the opening 22 and in either case will be tempted, by the smell of the cheese, to follow the path of the arrows shown in Figure 2. At this time the elevator is in its normal raised position. As the animal approaches the bait through the passage 56 it steps on the treadle 58 and thus depresses the latter. As the treadle is depressed the latch, formed by the shoulder 54, is released by the tilting of the lever 59. Thereupon the weight of the animal overbalances the counterweight and the elevator descends to the position shown in Figure 3. In this position the only escape for the animal is through the gateway 12 and he naturally seeks this escape because the recessed lower edge of the flap valve 65 apparently presents a passage beyond that valve, but when he passes under this flap valve 65 the flap valve 66 is raised by the action of the link 69 and thereby an apparently free passage is opened through the tube 13. Having once entered the tube he cannot return because of the movement of the valve 66, back to normal position with its lower edge bearing against the bottom wall of said chamber 12. As soon as the animal leaves the elevator the latter rises and is again latched for a second animal.

I claim:

An automatically operating animal trap having a casing or housing provided with oppositely located inlet openings, each visible from the other, an unobstructed passage-way between said openings, an elevator vertically movable in said casing and having a floor plate substantially level with the lower edges of said openings when the elevator is in its raised or upper position, a latch for normally holding the elevator in raised position, a second passage connecting with said first passage, a bait receptacle positioned adjacent said second passage, a tripping member in said second passage actuated by the weight of an animal to thereby release said latch and permit the descent of the elevator, and an escape passage-way in alinement with said floor plate when the elevator is in its lower position, and means operating to automatically return the empty elevator to raised position.

GEORGE F. FISHER.